(12) United States Patent
Vaze et al.

(10) Patent No.: US 8,114,952 B2
(45) Date of Patent: Feb. 14, 2012

(54) POLYCARBONATE-POLYESTER BLENDS, METHODS OF MANUFACTURE, AND ARTICLES THEREOF

(75) Inventors: Nina P. Vaze, Stabroek (BE); Tieb M. B. Aouraghe, Vlissingen (NL); Johannes Hubertus G. M. Lohmeijer, Hoogerheide (NL); Shreyas Chakravarti, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 643 days.

(21) Appl. No.: 12/201,165

(22) Filed: Aug. 29, 2008

(65) Prior Publication Data

US 2009/0286921 A1 Nov. 19, 2009

Related U.S. Application Data

(60) Provisional application No. 61/053,841, filed on May 16, 2008.

(51) Int. Cl.
*C08G 63/02* (2006.01)
*C08G 64/00* (2006.01)

(52) U.S. Cl. .............. 528/196; 428/220; 428/411.1; 428/412; 428/480; 524/296; 525/439

(58) Field of Classification Search .......... 428/220, 428/411.1, 412, 480; 524/296; 525/439; 528/196
See application file for complete search history.

(56) References Cited

U.S. PATENT DOCUMENTS

| 2005/0261460 | A1 | 11/2005 | Cella |
| 2006/0100394 | A1* | 5/2006 | Hale ............... 525/439 |
| 2008/0038519 | A1 | 2/2008 | Hoolhorst et al. |

FOREIGN PATENT DOCUMENTS

| WO | WO2007/050376 A1 | 5/2007 |
| WO | WO2008/057306 A2 | 5/2008 |

OTHER PUBLICATIONS

International Standard: ISO 75, "Strategic Principles for Future ICE and ISO Standardization in Industrial Automation," pp. 1-16 (2006).
International Standard: ISO 180, "Plastics-Determination of Izod Impact," pp. 1-10 (2000).
International Standard: ISO 294-Parts 1-5, "Plastics-Injection Moulding of Test Specimens of Thermoplastic Materials," pp. 1-64, (1996-2005).
International Standard: ISO 306, "Plastics-Thermoplastic Materials-Determination of Vicat Softening Temperature (VST)," pp. 1-9 (2004).
International Standard: ISO 527-Parts 1-5, "Plastics-Determination of Tensile Properties," pp. 1-54 (1993-1997).
International Standard: ISO 1133, "Plastics-Determination of the Melt Mass-Flow Rate (MFR) and the Melt Volume-Flow Rate (MVR) of Thermoplastics," pp. 1-16 (2005).
ASTM Designation: D 638-03, "Standard Test Method for Tensile Properties of Plastics," pp. 1-15 (2003).
ASTM Designation: D 1003-00, "Standard Test Method for Haze and Luminous Transmittance of Transparent Plastics," pp. 1-6 (2000).
ASTM Designation: D 1238-04, "Standard Test Method for Melt Flow Rates of Thermoplastics by Extrusion Plastometer," pp. 1-13 (2004).
International Search Report, dated Aug. 19, 2009, for PCT/US2009/044169, 3 pages.
Written Opinion for International Search Report dated Aug. 19, 2009 for PCT/US2009/044169, 6 pages.
International Preliminary Report on Patentability (IPRP) and Written Opinion mailed Nov. 25, 2010 for PCT/US2009/044169, 7 pages.

* cited by examiner

*Primary Examiner* — Terressa Boykin
(74) *Attorney, Agent, or Firm* — Cantor Colburn LLP; Diderico van Eyl

(57) ABSTRACT

A composition comprises a blend of 50 to 90 wt. % of a polycarbonate copolymer, 10 to 50 wt. % of a polyester wherein the weight percent of the polycarbonate copolymer and the polyester are each based on the total weight of the polycarbonate copolymer and the polyester. A molded sample of the composition having a thickness of 2.5 mm has a luminous transmittance of greater than 80% and a haze of less than 20% when measured in accordance with ASTM D 1003.

31 Claims, No Drawings

POLYCARBONATE-POLYESTER BLENDS, METHODS OF MANUFACTURE, AND ARTICLES THEREOF

CROSS-REFERENCE TO RELATED APPLICATION

This application claims the benefit of U.S. Provisional Application Ser. No. 61/053,841, filed May 16, 2008, now abandoned, which is incorporated by reference herein in its entirety.

BACKGROUND OF THE INVENTION

This disclosure relates to blends of polycarbonates and polyesters, and in particular to transparent blends of these polymers, their methods of manufacture, and articles thereof.

Blends of polycarbonate and polyesters have a number of advantageous properties, including toughness and chemical resistance. Such blends can also have high optical transparency. These properties make polycarbonate-polyester blends particularly useful in applications as diverse as medical containers and hot tub covers. However, these and other applications require that the blends retain their advantageous properties after aging particularly after exposure to heat and chemicals.

There accordingly remains a need in the art for transparent polycarbonate-polyester blends having improved heat and chemical resistance, and toughness, particularly retention of tensile properties after exposure to heat or chemicals. It would further be advantageous if such improvements were obtained without having a detrimental effect on other desirable properties such as transparency.

SUMMARY OF THE INVENTION

A composition comprises a blend of: 50 to 90 wt. % of a polycarbonate copolymer comprising from 20 to 40 mole percent of arylate carbonate units of the formula (1)

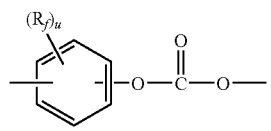

(1)

wherein $R^f$ is a halogen atom, a $C_{1-10}$ hydrocarbon or a halogen-substituted $C_{1-10}$ hydrocarbon and u is 0 to 4, and from 60 to 80 mole percent of carbonate units of the formula (3)

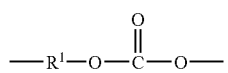

(3)

wherein $R^1$ is not of formula (1) and at least 60% of the $R^1$ groups are $C_{6-30}$ aromatic groups; and 10 to 50 wt. % of a polyester comprising units of the formula

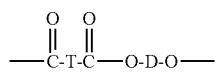

wherein T is a residue derived from a $C_5$-$C_7$ cycloaliphatic or $C_7$-$C_{12}$ aromatic dicarboxylic acid or a chemical equivalent thereof, and D is a residue derived from a $C_6$-$C_{12}$ aromatic or $C_2$-$C_{12}$ aliphatic diol or a chemical equivalent thereof provided that less than 50 mole percent of D is derived from 1,4-cyclohexanedimethanol or a chemical equivalent thereof; wherein the weight percent of the polycarbonate copolymer and the polyester are each based on the total weight of the polycarbonate copolymer and the polyester, and a molded sample of the composition having a thickness of 2.5 mm has a transmittance of greater than 80% and a haze of less than 20% when measured in accordance with ASTM D 1003.

A method of forming the composition comprises blending the components of the composition.

Also disclosed are articles comprising the composition. Films and fibers can be particularly mentioned.

Further disclosed is a method of forming an article comprising shaping by extruding, for example, films and fibers; blow molding; or injection molding the composition to form the article.

In another embodiment, a composition comprises a blend of: 50 to 90 wt. % of a polycarbonate copolymer comprising from 20 to 40 mole percent of carbonate units derived from hydroquinone or 2-methyl hydroquinone, and from 60 to 80 mole percent of carbonate units derived from bisphenol A; and 10 to 50 wt. % of a polyester comprising units of the formula

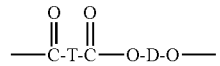

wherein T is a residue derived from a mixture of terephthalic acid and isophthalic acid, and D comprises a residue derived from a $C_2$-$C_4$ aliphatic diol or a chemical equivalent thereof, wherein the weight percent of the polycarbonate copolymer and the polyester are each based on the total weight of the polycarbonate copolymer and the polyester, and a molded sample of the composition having a thickness of 2.5 mm has a luminous transmittance of greater than 80% and a haze of less than 20% when measured in accordance with ASTM D 1003.

The above described and other features are exemplified by the following detailed description.

DETAILED DESCRIPTION OF THE INVENTION

This disclosure is based on the unexpected discovery of transparent blends of polycarbonates and polyesters whose optical properties are more resistant to heat-aging effects and to chemical contact with various household cleaning agents. Certain blends also show improved retention of tensile properties after heat-aging and chemical contact.

The singular forms "a," "an," and "the" include plural referents unless the context clearly dictates otherwise. Unless defined otherwise, technical and scientific terms used herein have the same meaning as is commonly understood by one of skill. The endpoints of all ranges directed to the same component or property are inclusive of the endpoint and independently combinable. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The polycarbonates used in the blends have two different types repeating structural carbonate units. The first type of repeating structural unit, present in an amount of 20 to 40 mol % (mole percent), is an arylate unit of formula (1)

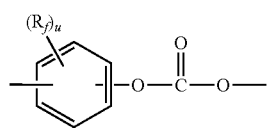 (1)

wherein each $R_f$ is independently a halogen atom, a $C_{1-10}$ hydrocarbon such as a $C_{6-10}$ aryl group or a $C_{1-10}$ alkyl group (more specifically, a $C_{1-5}$ alkyl group), a halogen-substituted $C_{1-10}$ hydrocarbon such as a $C_{6-10}$ aryl group or a halogen-substituted $C_{1-10}$ alkyl group (more specifically, a $C_{1-5}$ bromine-substituted alkyl group), and u is 0 to 4, specifically 0 to 2. Units of this type are derived from the corresponding aromatic diols of formula (2)

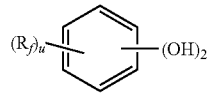 (2)

wherein $R_f$ and u are as defined above. The two hydroxyl groups are generally in a meta or para relationship. In one embodiment, the two hydroxyl groups are in a para relationship, give rising to para linkages in the carbonate units.

Examples of aromatic diols include substituted or unsubstituted resorcinol compounds, substituted or unsubstituted hydroquinones, substituted or unsubstituted catechols, and combinations thereof. More specific aromatic diols include resorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, catechol, hydroquinone, 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,5-di-t-butylhydroquinone, 2,3,5-trimethylhydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone. Even more specifically, the arylate carbonate unit is derived from hydroquinone or 2-methyl hydroquinone.

In addition to the arylate units of formula (1), the polycarbonates further comprise from 60 to 80 mol % of units of formula (3)

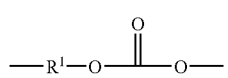 (3)

wherein $R^1$ is any divalent organic group, provided that $R^1$ is not derived from an aromatic diol of formula (2), and that at least 60% of the total number of the $R^1$ groups is a divalent $C_{6-30}$ aromatic group, with the balance being divalent aliphatic, alicyclic, or aromatic groups. In one embodiment, each $R^1$ group is a divalent aromatic group derived from a dihydroxy compound of the formula (4)

wherein each of $A^1$ and $A^2$ is a divalent aryl group, specifically a monocyclic aryl group, and $Y^1$ is a single bond or a bridging group having one or two atoms that separate $A^1$ from $A^2$. In an exemplary embodiment, one atom separates $A^1$ from $A^2$. Illustrative non-limiting examples of groups of this type are —O—, —S—, —S(O)—, —S(O)$_2$—, —C(O)—, or a saturated aliphatic or cycloaliphatic divalent hydrocarbon such as methylene, ethylidene, isopropylidene, neopentylidene, cyclohexylidene, cyclohexyl-methylene, 2-[2.2.1]-bicycloheptylidene, and adamantylidene.

Included within the scope of formula (4) are bisphenol compounds of formula (5)

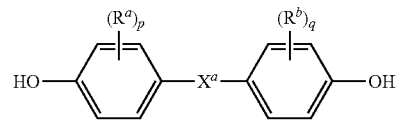 (5)

wherein $R^a$ and $R^b$ are each independently a halogen atom or a $C_{1-12}$ monovalent alkyl group, p and q are each independently integers of 0 to 4, and $X^a$ is a $C_{1-18}$ alkylene, a $C_{1-18}$ alkylidene, a $C_{3-18}$ cycloalkylidene, or a $C_{9-18}$ fused cycloalkylidene-aromatic group. For example, $X^a$ can be one of the groups of formula (6) or (7)

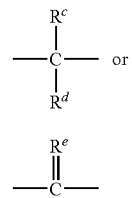

wherein $R^c$ and $R^d$ are each independently hydrogen, $C_{1-16}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl, a $C_{1-18}$ alkylidene bridging group, a $C_{3-18}$ cycloalkylidene bridging group, or a $C_{9-18}$ fused cycloalkylidene-aromatic bridging group In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)-, where Z is a substituent group selected from hydrogen, hydroxy, $C_{1-12}$ alkyl, $C_{1-12}$ alkoxy, or $C_{1-12}$ acyl.

Some illustrative examples of bisphenol compounds represented by formula (5) include 1,1-bis(4-hydroxyphenyl)

methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

In one specific embodiment, the polycarbonate contains 20 to 40 mole percent (mol %), specifically 25 to 40 mol %, more specifically to 30 to 40 mol % of arylate units of formula (1); and 60 to 80 mol %, specifically 65 to 80 mol %, more specifically 65 to 75 mol % of aromatic carbonate units of formula (3), specifically units derived from a bisphenol of formula (5). In a specific example of this embodiment, in formula (1) each $R_f$ is independently a halogen atom or a $C_{1-4}$ alkyl group, and u is 0 to 2, specifically 0 to 1, still more specifically 0, and in formula (5) $X^a$ represents a group of formula (6) wherein $R^c$ and $R^d$ are each a hydrogen or the same $C_{1-4}$ alkyl group, specifically the same $C_{1-3}$ alkyl group, even more specifically, methyl. Even more specifically, $X^a$ represents isopropylidene, and p and q are each zero. In another embodiment, in formula (1) u is 1 and $R_f$ is a methyl.

The thermoplastic composition can further comprise, based on total weight of the composition, 0 to 30 wt. % of a second polycarbonate comprising at least 50 mole percent bisphenol A. More specifically, the second polycarbonate can be bisphenol A polycarbonate (BPA). The second polycarbonate can also be derived from 1,1-bis-(4-hydroxy-3-methylphenyl)cyclohexane and bisphenol A in a mole ratio of 1:1, or from 3,3-bis-(4-hydroxyphenyl)-2-phenyl-2,3-dihydroisoindol-1-one and bisphenol A in a mole ratio of 33:67.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000, specifically 20,000 to 100,000 as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

The polycarbonate has flow properties useful for the manufacture of thin articles. Melt volume flow rate (often abbreviated MVR) measures the rate of extrusion of a thermoplastic composition through an orifice at a prescribed temperature and load. Polycarbonates useful for the formation of thin articles can have an MVR, measured at 300° C./1.2 kg, of 0.5 to 60 cubic centimeters per 10 minutes (also expressed as cc/10 min, ml/10 min, cm³/10 min), specifically 3 to 30 cm³/10 min. Combinations of polycarbonates of different flow properties can be used to achieve the overall desired flow property.

The polycarbonates are generally transparent, for example provide transparent articles after shaping by extruding and/or molding the compositions. In one embodiment the polycarbonate has a haze of less than 10.0% when molded into a 2.5 mm thick color chip, as determined by ASTM-1003. In another embodiment, the polycarbonate has a haze of less than 5.0% when molded into a 2.5 mm thick color chip, as determined by ASTM-1003.

The polycarbonates can be manufactured by processes such as interfacial polymerization and melt polymerization as is known in the art. Branched polycarbonates can be used, which can be prepared by adding a branching agent during polymerization. A chain stopper (also referred to as a capping agent) can be included during polymerization to control the molecular weight of the polycarbonate. Exemplary chain-stoppers include certain mono-phenolic compounds (e.g., p-cumyl-phenol), mono-carboxylic acid chlorides (e.g., benzoyl chloride), and monochloroformates (e.g., phenyl chloroformate).

The thermoplastic compositions further comprise polyesters comprising repeating units of formula (8)

(8)

wherein T is a divalent residue derived from a $C_5$-$C_7$ cycloaliphatic or $C_7$-$C_{12}$ aromatic dicarboxylic acid or a chemical equivalent thereof, and D is a divalent residue derived from a $C_6$-$C_{12}$ aromatic or $C_2$-$C_{12}$ aliphatic diol or a chemical equivalent thereof provided that less than 50 mole percent of D is derived from 1,4-cyclohexanedimethanol or a chemical equivalent thereof Examples of aromatic dicarboxylic acids that can be used to prepare the polyester units include isophthalic acid, terephthalic acid, 1,2-di(p-carboxyphenyl)ethane, 4,4'-dicarboxydiphenyl ether, 4,4'-bisbenzoic acid, and combinations comprising at least one of the foregoing dicarboxylic acids. Dicarboxylic acids containing fused rings can also be used, such as 1,4-, 1,5-, or 2,6-naphthalenedicarboxylic acids. Exemplary cycloaliphatic dicarboxylic acids include decahydronaphthalene dicarboxylic acids, norbornene dicarboxylic acids, bicyclooctane dicarboxylic acids, 1,4-cyclohexanedicarboxylic acid, and the like. As used herein, a "chemical equivalent" of a carboxylic acid is the corresponding anhydride, acid chloride, acid bromide, carboxylate salt, or ester, e.g., a $C_{1-8}$ ester such as a methyl ester, phenyl ester, or the like.

Specific dicarboxylic acids are terephthalic acid, isophthalic acid, naphthalene dicarboxylic acid, 1,4-cyclohexane dicarboxylic acid (cis or trans), or combinations thereof A specific dicarboxylic acid comprises a combination of isophthalic acid and terephthalic acid wherein the weight ratio of isophthalic acid to terephthalic acid is 91:9 to 2:98.

Specific $C_6$-$C_{12}$ aromatic diols include but are not limited to the diols of formula (2), for example resorcinol, hydroquinone, and pyrocatechol, as well as diols such as 1,5-naphthalene diol, 2,6-naphthalene diol, 1,4-napthalene diol, 4,4'-dihydroxybiphenyl, bis(4-hydroxyphenyl)ether, bis(4-hydroxyphenyl)sulfone, and the like, and combinations comprising at least one of the foregoing aromatic diols.

Exemplary $C_2$-$C_{12}$ aliphatic diols include but are not limited to 1,2-ethylene glycol, 1,2- and 1,3-propylene glycol, 2,2-dimethyl-1,3-propane diol, 2-ethyl-2-methyl-1,3-propane diol, 1,2-butanediol, 1,3-butanediol, 1,4-butanediol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like, and combinations comprising at least one of the foregoing aliphatic diols. As used herein, a "chemical equivalent" of a an alcohol is the corresponding ester, specifically a $C_{1-8}$ ester such as an acetate ester.

More specifically, the polyester can comprise a T residue derived from an aromatic dicarboxylic acid, optionally in combination with a different aliphatic or aromatic dicarboxylic acid or equivalent thereof, and D is a residue derived from a $C_{2-4}$ diol provided that less than 50 mole percent of D is derived from 1,4-cyclohexanedimethanol or a chemical equivalent thereof Molded samples of blend compositions comprising these polyesters can have Notched Izod impact values greater than 30 kJ/m² when measured in accordance with ISO-180 at 23° C. In one embodiment, T is derived from a mixture of terephthalic acid and isophthalic acid and D comprises up to 100 mole percent of a residue derived from a $C_{2-4}$ diol. Even more specifically, D comprises a residue derived from ethylene glycol or 1,4-butanediol.

The D groups can also be derived from a cycloaliphatic diol or chemical equivalent thereof. In one embodiment, 20 to 40 mole percent of D is derived from 1,4-cyclohexanedimethanol or a chemical equivalent thereof based on total moles of D in the polyester. More specifically, T is derived from a mixture of terephthalic acid and isophthalic acid and D comprises 20 to 40 mole percent of a residue derived from 1,4-cyclohexanedimethanol based on total moles of D in the polyester. Non-limiting examples of chemical equivalents of alcohols include alkali metal alkoxides, metal oxides, sulfonate esters, silyl ethers, and alkyl halides.

Another class of polyesters within the scope of formula (8) are the poly(cycloalkylene phthalate)s such as poly(cyclohexanedimethanol terephthalate) (PCT), having recurring units of formula (9)

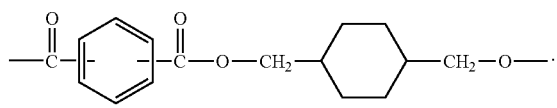

(9)

In one embodiment, the phenylene ring is derived from a combination of isophthalic acid and terephthalic acid wherein the weight ratio of isophthalic acid to terephthalic acid is 91:9 to 2:98.

Another specific class of polyesters within the scope of formula (8) is the poly(cycloalkylene cycloalkanoate)s where T and D each contain cycloalkyl groups. In o n e embodiment, T is derived from cyclohexane dicarboxylic acid and at least 50 mol % of D is derived from 1,4-cyclohexane dimethanol, and 0-50 mol % of D is derived from a divalent group derived from 1,6-hexane diol, dimethanol decalin, dimethanol bicyclooctane, trans-isomers, 1,10-decane diol, and the like. A particularly useful poly(cycloalkylene cycloalkanoate) is poly(cyclohexane-1,4-dimethylene cyclohexane-1,4-dicarboxylate), also referred to as poly(1,4-cyclohexane-dimethanol-1,4-dicarboxylate) (PCCD), having recurring units of formula (10)

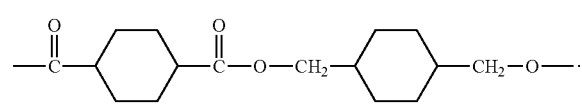

(10)

The cis or trans isomers (or a mixture thereof) of the disubstituted cyclohexanes can be used.

Other examples of polyesters are copolyesters derived from an aromatic dicarboxylic acid and a combination of a linear aliphatic diol (in particular ethylene glycol, butylene glycol, poly(ethylene glycol) or poly(butylene glycol)) with 1,4-cyclohexane dimethanol. The ester units comprising the linear aliphatic or cycloaliphatic ester units can be present in the polymer chain as individual units, or as blocks of the same type of units. A specific ester of this type is poly(cyclohexanedimethylene terephthalate)-co-poly(ethylene terephthalate) (PCTG) wherein greater than 50 mol % of the ester groups are derived from 1,4-cyclohexanedimethanol.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The polyesters can have an intrinsic viscosity, as determined in chloroform at 25° C., of 0.3 to 1.5 deciliters per gram (dl/gm), specifically 0.45 to 1.0 dl/gm. The polyesters can have a weight average molecular weight of 10,000 to 200,000, specifically 20,000 to 100,000 as measured by gel permeation chromatography (GPC).

The relative ratios of the polycarbonate and the polyester will depend on the desired characteristics of the compositions. In general, the thermoplastic compositions comprise 50 to 90 weight percent (wt. %), specifically 50 to 80 wt. % polycarbonate; and 10 to 50 wt. %, specifically 20 to 40 wt. % polyester.

A molded sample of the composition has a heat deflection temperature (HDT) greater than 75° C., more specifically greater than 80° C., and more specifically greater than 85° C. at 1.8 MPa in accordance with ISO 75. The compositions have a Vicat temperature greater than 90° C. when measured in accordance with ISO 306.

It is further desirable for the polycarbonate-polyester blends to have an melt volume flow rate (MVR) greater than 5 cm³/10 min, more specifically greater than 10 cm³/10 min, and even more specifically greater than 15 cm³/10 min, when measured at 265° C. and a load of 2.16 kilograms, or at 295° C. and a load of 2.2 kilograms according to ISO 1133.

It has been found that the polycarbonate-polyester blends have good optical characteristics, in particular good light transparency. A 2.5 mm thick molded sample of the blend has a luminous transmittance (% T) of 80% or greater, 82% or greater, 85% or greater, and more specifically 88% or greater, and a haze (% H) less than 20%, less than 15%, less than 10%, and more specifically less than 6%, each measured according to ASTM D 1003-00.

The optical properties are substantially unchanged after heat-aging a molded sample of the composition at 110° C. for 3 hours, or after heat-aging a molded sample of the composition at the Vicat temperature for 3 hours. In a specific embodiment, when the composition comprises 15 to 50 weight percent of the polyester, wherein T in formula (8) is a residue derived from a cycloaliphatic dicarboxylic acid, heat-aging a sample of the composition at 100° C. for 3 hours does not alter the percent transmission and percent haze of the sample by more than 5 percent of the pre-heat-aged values.

A molded sample of the polycarbonate-polyester blends can have a Notched Izod impact strength of at least 5 kJ/m², more particularly at least 10 kJ/m², even more particularly at least 30 kJ/m², and still more particularly at least 50 kJ/m² when measured in accordance with ISO 180 at 23° C.

A molded sample of the composition also has a tensile elongation at break greater than 75%, greater than 80%, and even greater than 90% when measured in accordance with ASTM D638.

The optical transparency and tensile properties of the blended compositions are surprisingly resistant to chemical exposure. A molded sample of the composition does not develop cracks or haze, and the sample does not dissolve or swell when contacted with at least one of oleic acid, suntan lotion (COPPERTONE™ by Schering-Plough HealthCare Products, Inc.), window cleaning agent (WINDEX™ sold by S. C. Johnson & Son, Inc.), or household cleaning agent (FORMULA 409™ sold by Clorox Company) for 48 hours at 23° C. Further, a molded sample of the composition retains at least 80% of its initial tensile elongation at break after contact with at least one of oleic acid, suntan lotion, window cleaning agent, or household cleaning agent.

In addition to the polycarbonate and polyester as described above, the thermoplastic composition can comprise various additives ordinarily incorporated in resin compositions of this type, with the proviso that the additives are selected so as to not significantly adversely affect the desired properties of the thermoplastic composition. Exemplary additives include impact modifiers, fillers, antioxidants, thermal stabilizers, light stabilizers, ultraviolet light (UV) absorbing additives, quenchers, plasticizers, lubricants, mold release agents, anti-static agents, dyes, pigments, light effect additives, flame retardants, anti-drip agents, and radiation stabilizers. Combinations of additives can be used. Such additives can be mixed at a suitable time during the mixing of the components for forming the composition. Impact modifiers are generally present in amounts of 2 to 30 wt. %, based on the total weight of the polymers in the composition. Fillers, if present, are used in amounts low enough to not substantially adversely affect the desired optical properties of the compositions. Other additives are generally present in an amount from 0.01 to 5 wt. %, based on the total weight of the composition, excluding any fillers.

Representative impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used. Specific impact modifiers include a natural rubber, a low-density polyethylene, a high-density polyethylene, a polypropylene, a polystyrene, a polybutadiene, a styrene-butadiene copolymer, a styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), a styrene-acrylonitrile (SAN), an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide) glycol block copolymer, a silicone rubber, or a combination comprising at least one of the foregoing impact modifiers.

The thermoplastic compositions can be manufactured by various methods. For example, powdered polycarbonate, polyester, and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side feeder. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Articles comprising the polycarbonate-polyester blends are also disclosed. Examples of articles include films (thin layers, e.g., 5 mm or less), sheets (thicker layers e.g., greater than 5 mm), molded objects, and composites, e.g., a film comprising the composition disposed on a polycarbonate, polyethylene, or metal layer. Such articles can be, for example, components of household appliances, telecommunication devices, electronic devices, automotive parts, or electrical switches. These include computer and business machine housings such as housings for monitors, handheld electronic device housings such as housings for cell phones, electrical connectors and components of lighting fixtures, ornaments, roofs, greenhouses, sun rooms, swimming pool enclosures, and the like.

The articles can be formed from the compositions by thermoplastic shaping processes such as film and sheet extrusion, injection molding, gas-assist injection molding, extrusion molding, compression molding, and blow molding. Film and sheet extrusion processes include but are not limited to melt casting, blown film extrusion, and calendering. Co-extrusion and lamination processes can be used to form composite multi-layer films or sheets.

Films and sheets can be prepared by casting a solution or suspension of the composition in a suitable solvent onto a substrate, belt, or roll, followed by removal of the solvent.

Single or multiple layers of coatings can further be applied to the single or multi-layer substrates to impart additional properties such as scratch resistance, ultra violet light resistance, and/or aesthetic appeal providing they do not adversely effect other properties such as transparency or heat-aging properties. Coatings can be applied through standard application techniques such as rolling, spraying, dipping, brushing, or flow-coating.

Oriented films comprising the compositions can be prepared through blown film extrusion or by stretching cast or calendared films in the vicinity of the thermal deformation temperature using conventional stretching techniques. For instance, a radial stretching pantograph can be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions can used to form a multi-wall sheet. Such sheets are known, being described, for example, in U.S. Publication No. 2008-0038519, which is incorporated herein by reference in its entirety. Multiwall sheets comprise a first sheet having a first side and a second side, wherein the first sheet comprises a thermoplastic polymer, and the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above can further be thermoplastically processed into shaped articles via forming and molding processes such as thermoforming, vacuum forming, pressure forming, injection molding, and compression molding. Multi-layered shaped articles can also be formed by injection molding a thermoplastic resin onto a single or multilayer film or sheet substrate by: providing a single or multilayer thermoplastic substrate having optionally one or more colors on the surface, for instance, using screen printing or a transfer dye; conforming the substrate to a mold configuration such as by forming and trimming a substrate into a three dimensional shape, and fitting the substrate into a mold having a surface which matches the three dimensional shape of the substrate; and injecting a thermoplastic resin into the mold cavity behind the substrate to produce a one-piece permanently bonded three-dimensional product, or to transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition can further be applied to the above articles to alter surface appearances and impart additional functionalities to the articles.

The thermoplastic polycarbonate-polyester blends are further illustrated by the following non-limiting examples.

EXAMPLES

TABLE 1

| Acronym | Component | Source |
| --- | --- | --- |
| PC | Bisphenol A polycarbonate resin (Mw = 30,000, using polycarbonate standards) | Sabic Innovative Plastics |
| PETG | Poly(70 mol % ethylene terephthalate)-co-(30 mol % 1,4-cyclohexanedimethylene terephthalate) (Mw = 70,000 g/mol, PS standards) | Eastman Chemical |
| PBT | Poly(butylene terephthalate) (Mw = 105,000 g/mol, PS standard) | Sabic Innovative Plastics |
| Copolymer | Hydroquinone-bisphenol A polycarbonate copolymer, having a 30:70 mole ratio of hydroquinone to bisphenol A (Mw = 28,500 using polycarbonate standards | Sabic Innovative Plastics |

Preparation Processes/Techniques

The compositions used in the Examples were made as follows. All thermoplastic compositions except where indicated were compounded on a 25 mm Werner and Pfleiderer co-rotating twin screw extruder with a vacuum vented mixing screw, at a barrel and die head temperature between 240 and 265° C., and a screw speed of 150 to 300 revolutions per minute. The extruder had eight independent feeders, and can be operated at a maximum rate of 300 pounds per hour. The twin-screw extruder had enough distributive and dispersive mixing elements to produce good mixing between the polymer compositions. The extrudate was cooled through a water bath, and then pelletized. The compositions are subsequently molded according to ISO 294 on an Engel injection-molding machine with a set temperature of approximately 240 to 290° C. The pellets were dried for 3 to 4 hours at approximately 80° C. in a forced-air circulating oven prior to injection molding. It will be recognized by one skilled in the art that the method is not limited to these temperatures or to this apparatus.

Testing Processes/Techniques

Melt volume rate (MVR) was determined using pellets dried for 2 hours at 80° C., in accordance with ISO 1133 at 265° C. at a load of 2.16 kg or 295° C. at a load of 2.2 kg, at dwelling time of 240 seconds and 0.0825 inch (2.1 mm) orifice, and is reported in cubic centimeters per 10 minutes ($cm^3/10$ min).

Notched Izod impact ("NII") was measured on 80×10×4 mm (length×width×thickness) impact bars at 23° C. according to ISO 180, using a 5.5 Joule pendulum, and is reported in kilojoules per squared meter ($kJ/m^2$).

Haze and luminous transmittance were measured according to ASTM D 1003 using a 2.5 mm color chip, and are reported in percentages as % Haze (% H) and % Transmittance (% T).

Tensile properties were tested according to ISO 527 on 150×10×4 mm (length×width×thickness) injection molded bars at 23° C. with a crosshead speed of 5 mm/min. Percent retention of tensile elongation at break as determined for ESCR tests (environmental stress cracking resistance), and is equal to 100×(tensile elongation at break after the ESCR test)/(tensile elongation at break before ESCR). The test is as follows: a tensile bar of the composition is exposed to the chemical, followed by ISO 527 tensile test. Tensile elongation at break, tensile stress at yield are the values obtained.

Heat deflection temperature (HDT) was measured according to ISO 75 on 80×10×4 mm (length×width×thickness) injection molded bars.

Vicat softening temperature was measured according to ISO 306 on 80×10×4 mm (length×width×thickness) injection molded bars.

Table 2 summarizes the test protocols. Room temperature (RT) is 23° C.

TABLE 2

| | Test Standard | Default Specimen Type | Units |
| --- | --- | --- | --- |
| ISO HDT Test | ISO 75 | Bar - 80 × 10 × 4 mm | ° C. |
| ISO Tensile Test | ISO 527 | Multi-purpose ISO 3167 Type A | MPa |
| ISO Izod at Room Temperature, 23° C. | ISO 180 | Multi-purpose ISO 3167 Type A | $kJ/m^2$ |
| ISO Melt Volume Rate Test | ISO 1133 | Pellets | $cm^3/10$ min |
| ISO Vicat Softening Temperature | ISO 306 | Bar - 80 × 10 × 4 mm | ° C. |

Examples 1-3 and Comparative Example C1

Comparative example C1 and Examples 1-3 in Table 3 illustrate binary blends of the HQ/BPA copolymer and PETG.

TABLE 3

|  | 1 | 2 | 3 | C1 |
|---|---|---|---|---|
| Copolymer | 85 | 75 | 50 | — |
| PC | — | — | — | 50 |
| PETG | 15 | 25 | 50 | 50 |
| % Haze | 3 | 3 | 3 | >25 |
| % Transmittance | 88 | 88 | 88 | <50 |
| Notched Izod at 23° C. (kJ/m$^2$) | 70 | 12 | 7 | |
| HDT at 1.8 MPa (° C.) | 109 | 102 | 86 | |
| Vicat Temperature (° C.) | 128 | 120 | 102 | |
| Heat-aging at 110° C., Visual Effect on Transparency | No change | No change | No change | |
| Heat-aging at Vicat temperature, Visual effect on Transparency | No change | No change | No change | |
| Tensile Mod (MPa) | 2300 | 2200 | 2100 | |
| Elongation at Break (%) | 80 | 90 | 127 | |
| Flexural Modulus (MPa) | 2200 | 2255 | 2100 | |
| Flexural Stress (MPa) | 94 | 95 | 87 | |
| COPPERTONE ™ | | | | |
| Visual | No change | No change | Cracks | |
| % Retention of Elongation at Break | 96 | 100 | <70 | |
| Oleic Acid | | | | |
| Visual | No change | No change | No change | |
| % Retention of Elongation at Break | 96 | 100 | 100 | |
| FORMULA 409 ™ | | | | |
| Visual | No change | No change | Cracks | |
| % Retention of Elongation at Break | 82 | 100 | <70 | |

The data in Table 3 demonstrate that binary blends of the HQ/BPA copolymer and PETG, Examples 1-3, are transparent, having 3% haze and 88% luminous transmittance compared to the PC/PETG blend, C1, having less than 50% transmittance and greater than 25% haze. The Notched Izod impact value for Example 1, comprising 15 wt. % PETG, was 70 kJ/m$^2$. Examples 1-3 are further characterized by a heat deflection temperature greater than 85° C. and a Vicat temperature above 100° C. The blends show good retention of optical properties on heat-aging at 110° C. for 3 hours or heat-aging at the Vicat temperature for 3 hours. Good chemical resistance to at least one of oleic acid, suntan lotion (COPPERTONE™), or household cleaning agent (FORMULA 409™) was also observed, particularly for Examples 1 and 2, for which no change in transparency was visually detected after each of the chemical exposure tests. Examples 1 and 2 also had greater than 90% retention of elongation at break after each of the above chemical exposure tests.

Examples 4-8, and Comparative Examples C2-C3

The following comparative examples C2-C3 and Examples 4-8 in Table 4 illustrate additional binary blends of PBT and the 30HQ/BPA copolymer.

TABLE 4

|  | 4 | 5 | 6 | 7 | 8 | C2 | C3 |
|---|---|---|---|---|---|---|---|
| Copolymer | 85 | 75 | 70 | 60 | 50 | 40 | 25 |
| PBT | 15 | 25 | 30 | 40 | 50 | 60 | 75 |
| % Haze | 3 | 4 | 2 | 2 | 6 | >50 | >50 |
| % Transmittance | 88 | 88 | 88 | 88 | 88 | <50 | <50 |
| Notched Izod at 23° C. (kJ/m$^2$) | 73 | 7 | 8 | 6 | 5 | | |
| COPPERTONE ™ Solution | | | | | | | |
| Visual | No cracks | No cracks | | | No cracks | | |
| Elongation at break retention (%) | 86 | 100 | | | 92 | | |
| WINDEX ™ Cleaner | | | | | | | |
| Visual | No cracks | No cracks | | | No cracks | | |
| Elongation at break retention (%) | 84 | 100 | | | 100 | | |
| Oleic Acid | | | | | | | |
| Visual | No cracks | No cracks | | | No cracks | | |
| Elongation at break retention (%) | 84 | 100 | | | 90 | | |

Examples 4-8 comprising PBT were also transparent, having 2-6% haze and 88% luminous transmittance. High room temperature Notched Izod impact values were also observed for Example 1, comprising 15 wt. % PBT. Examples 4, 5, and 8 also had good chemical resistance to oleic acid, suntan lotion (COPPERTONE™), and window cleaning agent (WINDEX™).

Example 9

Example 9 in Table 5 illustrates a transparent ternary blend of PBT, PC, and the 30HQ/BPA copolymer. In this example, heating a test bar at the Vicat temperature of 92° C. caused no change.

TABLE 5

|  | Example 9 |
|---|---|
| HQ/BPA Copolymer | 60 |
| PBT | 30 |
| PC | 10 |
| % Haze | 2 |
| % Transmittance | 88 |
| HDT (1.8 MPa) ° C. | 75 |
| Vicat (° C.) | 92 |
| Visual appearance after heat-aging at Vicat temperature (3 hrs) | No Change |
| Visual appearance after heat-aging at 110° C. (3 hrs) | Opaque |

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein. All references cited herein are incorporated herein by reference.

We claim:

1. A composition comprising a blend of:
   50 to 90 wt. % of a polycarbonate copolymer comprising from 20 to 40 mole percent of arylate carbonate units of the formula (1)

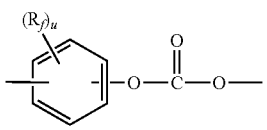

(1)

wherein $R^f$ is a halogen atom, a $C_{1-10}$ hydrocarbon or a halogen-substituted $C_{1-10}$ hydrocarbon and u is 0 to 4, and from 60 to 80 mole percent of carbonate units of the formula (3)

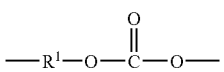

(3)

wherein $R^1$ is not of formula (1) and at least 60% of the $R^1$ groups are divalent $C_{6-30}$ aromatic groups; and 10 to 50 wt. % of a polyester comprising units of the formula

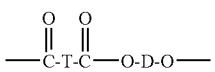

wherein T is a divalent residue derived from a $C_5$-$C_7$ cycloaliphatic or $C_7$-$C_{12}$ aromatic dicarboxylic acid or a chemical equivalent thereof, and D is a divalent residue derived from a $C_6$-$C_{12}$ aromatic or $C_2$-$C_{12}$ aliphatic diol or a chemical equivalent thereof, provided that less than 50 mole percent of D is derived from 1,4-cyclohexanedimethanol or a chemical equivalent thereof, wherein the weight percent of the polycarbonate copolymer and the polyester are each based on the total weight of the polycarbonate copolymer and the polyester, and a molded sample of the composition having a thickness of 2.5 mm has a luminous transmittance of greater than 80% and a haze of less than 20% when measured in accordance with ASTM D 1003.

2. The composition of claim 1, wherein a molded sample having a thickness of 2.5 mm has a luminous transmittance of greater than or equal to 85%, and a haze value of less than or equal to 10% when measured in accordance with ASTM D 1003.

3. The composition of claim 1, wherein a molded sample of the composition has a Notched Izod impact value of more than 30 kJ/m$^2$, measured in accordance with ISO 180 at 23° C.

4. The composition of claim 1, wherein a molded sample of the composition has a Notched Izod impact value of more than 50 kJ/m$^2$, measured in accordance with ISO 180 at 23° C.

5. The composition of claim 1, wherein a molded sample of the composition has a tensile elongation at break of greater than 75% when measured in accordance with ASTM D638.

6. The composition of claim 1, wherein a molded sample of the composition has a heat deflection temperature is greater than 75° C. at 1.8 MPa in accordance with ISO 75.

7. The composition of claim 1, wherein the composition has a melt volume rate of greater than 5 cm$^3$/10 min in accordance with ISO 1133 at 265° C.

8. The composition of claim 1, wherein the composition has a melt volume rate of greater than 10 cm$^3$/10 min in accordance with ISO 1133 at 265° C.

9. The composition of claim 1, wherein a molded sample of the composition has a Vicat temperature of greater than 90° C. when measured in accordance with ISO 306.

10. The composition of claim 1, wherein the optical properties of a molded sample of the composition are substantially unchanged after heat-aging the sample 110° C. for 3 hours.

11. The composition of claim 9, wherein the optical properties of a molded sample of the composition are substantially unchanged after heat-aging the sample at the Vicat temperature for 3 hours.

12. The composition of claim 1, wherein the optical properties of a molded sample of the composition of 4 mm thickness does not develop cracks or haze, and the sample does not dissolve or swell when contacted with at least one of oleic acid, suntan lotion, window cleaning agent, or household cleaning agent at a temperature of 23 C. for 48 hours.

13. The composition of claim 1, wherein a molded sample of the composition of 4 mm thickness retains at least 80% of its initial tensile elongation at break when contacted with at least one of oleic acid, suntan lotion, window cleaning agent, or household cleaning agent when measured in accordance with ISO 527 when at a temperature of 23 C. for 48 hours.

14. The composition of claim 1, wherein $R^1$ is derived from a bisphenol of the formula

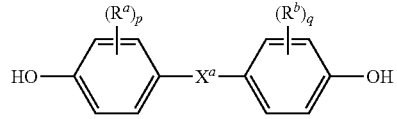

wherein $R^a$ and $R^b$ are each independently a halogen atom or a $C_{1-12}$ monovalent alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and p and q are each independently 0 to 4.

15. The composition of claim 14, wherein $X^a$ is isopropylidene and p and q are each zero.

16. The composition of claim 1, wherein T is a residue derived from an aromatic dicarboxylic acid, optionally in combination with a different aliphatic or aromatic dicarboxylic acid or equivalent thereof, and D further comprises a residue derived from a $C_{2-4}$ diol and wherein the blend has a Notched Izod impact value greater than 30 kJ/m$^2$ when measured in accordance with ISO-180 at 23° C.

17. The composition of claim 1, wherein T is derived from a mixture of terephthalic acid and isophthalic acid and D comprises 20 to 40 mole percent of a residue derived from 1,4-cyclohexanedimethanol based on total moles of D in the polyester.

18. The composition of claim 1, wherein u is zero.

19. The composition of claim 1, wherein the arylate unit linkages are para to one another.

20. The composition of claim 1, wherein the arylate carbonate units are derived from 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, catechol, hydroquinone; 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,5-di-t-butylhydroquinone, 2,3,5-trimethyl-hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or a combination comprising at least one of the foregoing compounds.

21. The composition of claim 1, further comprising an impact modifier, filler, antioxidant, a thermal stabilizer, a light stabilizer, an ultraviolet light absorbing additive, a quencher, a plasticizer, a lubricant, a mold release agent, an antistatic agents, a dye, a pigment, a filler, a light effect additive, a flame retardant, an anti-drip agent, a radiation stabilizer, or a combination comprising at least one of the foregoing additives.

22. The composition of claim 1, wherein the composition further comprises a polycarbonate in an amount that is more than 0 and less than 25 weight percent.

23. An article comprising the composition of claim 1.

24. The article of claim 23, comprising a film, sheet, molded object, or composite.

25. The article of claim 23, wherein the article is an extruded film or an extruded sheet.

26. The article of claim 23, wherein the film, sheet, molded object, or composite has at least one layer comprising the composition.

27. A method of forming an article, comprising shaping by extruding, blow molding, injection molding, or gas-assisted injection molding the composition of claim 1 to form the article.

28. A method of forming a composition, comprising blending the components of the composition of claim 1.

29. A composition comprising a blend of:
  50 to 90 wt. % of a polycarbonate copolymer comprising
    from 20 to 40 mole percent of carbonate units derived from hydroquinone or 2-methyl hydroquinone, and
    from 60 to 80 mole percent of carbonate units derived from bisphenol A; and
  10 to 50 wt. % of a polyester comprising units of the formula

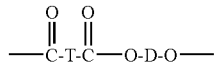

wherein T is a residue derived from a mixture of terephthalic acid and isophthalic acid, and D comprises a residue derived from a $C_2$-$C_4$ aliphatic diol or a chemical equivalent thereof, provided that less than 50 mole percent of D is derived from 1,4-cyclohexanedimethanol or a chemical equivalent thereof, wherein
  the weight percent of the polycarbonate copolymer and the polyester are each based on the total weight of the polycarbonate copolymer and the polyester, and
  a molded sample of the composition having a thickness of 2.5 mm has a luminous transmittance of greater than 80% and a haze of less than 20% when measured in accordance with ASTM D 1003.

30. The composition of claim 29, wherein D comprises 20 to 40 mole percent of a residue derived from 1,4-cyclohexanedimethanol based on total moles of D units in the polyester.

31. The composition of claim 29, wherein the composition further comprises a polycarbonate in an amount that is more than 0 and less than 25 weight percent.

* * * * *